Aug. 18, 1953     E. NASSOUR     2,649,015
CAMERA CONTROL SYSTEM FOR THE SEQUENTIAL OPERATION OF CAMERAS
Filed Jan. 7, 1950

INVENTOR.
EDWARD NASSOUR
BY Wm. Edward Hann
Attorney

Patented Aug. 18, 1953

2,649,015

UNITED STATES PATENT OFFICE 2,649,015

CAMERA CONTROL SYSTEM FOR THE SEQUENTIAL OPERATION OF CAMERAS

Edward Nassour, Los Angeles, Calif.

Application January 7, 1950, Serial No. 137,437

1 Claim. (Cl. 88—16)

This invention relates to a camera control system and more particularly to means for sequentially controlling the operation of a plurality of cameras located about an area to be photographed.

The invention relates more particularly to a camera control system for use in making motion pictures of racing contests and more specifically of horse racing contests.

Objects of the invention are to provide means whereby a plurality of electrically operated cameras can be successively rendered operative and inoperative; to provide means whereby the operation of successive pairs of cameras will overlap during at least a part of their individual periods of operation; to provide means whereby one or more cameras can be maintained inoperative through a cycle of the operation of the group of cameras; to provide means whereby the period of actuation of any one camera can be varied in length, and generally to provide means whereby a scene such as a horse race can be conveniently and completely photographed to the best advantage.

The above and other objects and advantages of the invention will more fully appear from the following description made in connection with the accompanying drawing wherein.

Figure 1:
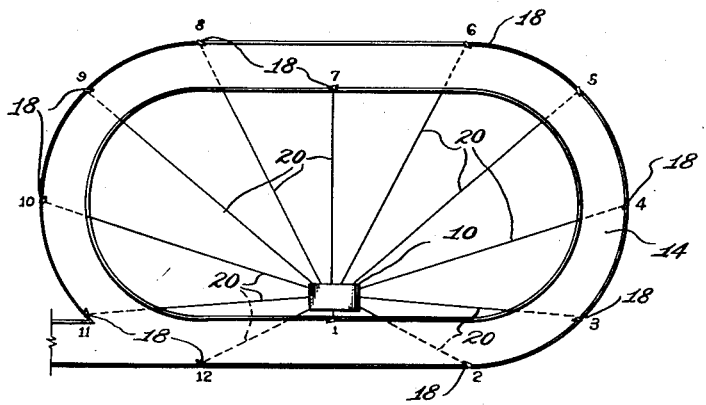
Fig. 1 is a diagrammatic plan view of the system as applied to a race track.

In Fig. 1 there is shown a race track 14. In the infield adjacent one straightaway is a control station 16 which may also serve as the usual judges' stand.

Located at spaced points about the track are cameras 18 which bear numerical indicia in the specific embodiment shown, there being twelve cameras numbered in sequence about the track. Each of the cameras is shown in Fig. 1 to be connected to the control station 16 by a control circuit wire 20.

Figure 3:
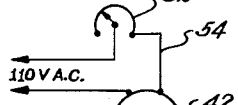
Fig. 3 is a diagrammatic layout of the electrical control system.
Figure 3:
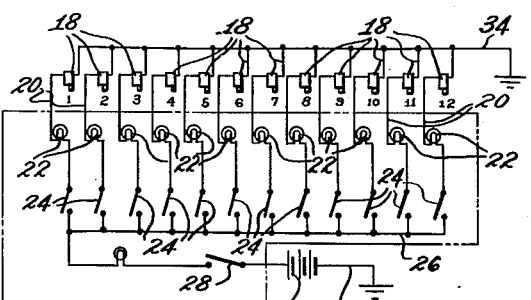

In Fig. 3 there is shown a form of control circuit. Each control circuit wire 20 is shown extending from a camera 18 through a tell-tale light 22 to a switch 24. Each switch 24 is connected to a wire 26 which leads to a main cutout switch 28 and thence to a source of current shown as a battery 30, although any suitable power source can be used. The battery 30 is provided with a ground connection 32 and each of the cameras 18 is connected to a ground wire 34.

The circuit unit shown in Fig. 3 permits anyone or all of the cameras 18 to be operated by closing its respective switch 24. It is preferred in the photographing of a scene, such as a horse race, to successively close and open the circuits to the cameras in a sequential operation. It is not necessary that camera number one be operated first, but it is more convenient to set up the cameras and their controls so that number one camera will be the first to be operated.

Figure 2:
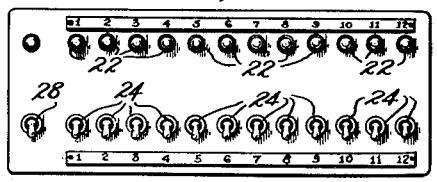
Fig. 2 is a plan view of a circuit control panel.

In Fig. 2 there is shown a switch panel wherein the switches 24 are shown as toggle switches which are relatively closely spaced so that one switch can be operated to close a camera circuit and the preceding switch operated to open the circuit to its particular camera. The switches are closely spaced so that this successive opening and closing can be accomplished with the fingers of one hand.

It should be noted that anyone or more of the switches 24 can be skipped in a cycle of operation where the actuation of a particular camera is not desired during that cycle.

Figure 5:
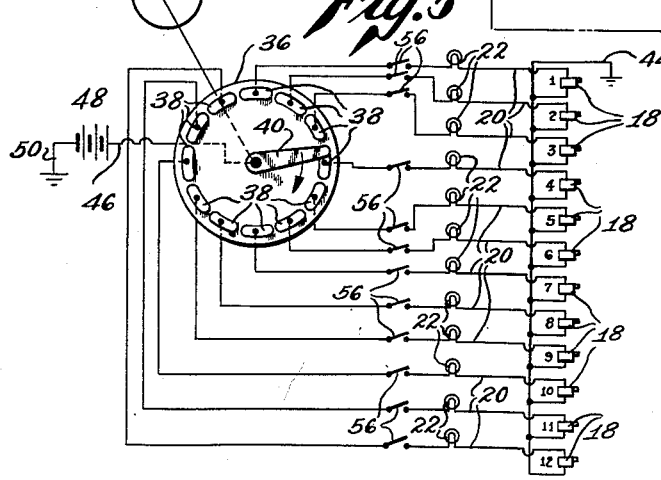
Fig. 5 is a diagram of a specifically different type of control circuit.

In Fig. 5 there is shown a different type of control. There is illustrated a contact supporting disc 36 having a plurality of contacts 38 carried thereby, said contacts preferably being individually mounted. Each of the contacts 38 is connected to one of the camera control circuit wires 20. Rotatably supported by the disc 36 is a contact arm 40 which is driven by a synchronous motor 42. The camera control mechanism is grounded at the cameras as shown at 44 and the rotary switch arm 40 is connected by a wire 46 to a battery 48 which is grounded by a contactor 50.

The synchronous motor is adapted to rotate the contact rotor at a suitable speed so that it will successively engage the contacts 38 and similarly successively actuate and cut out the individual cameras.

Means is provided whereby the period of operation of each camera can be varied. This is done through the location of a rheostat 52 in the power circuit 54 which provides energy for the motor 42.

Each of the individual camera circuit wires 20 is provided with a circuit breaker 56 so that one or more individual cameras can be left out of a cycle of operation when desired.

It is preferred that the contacts 38 be sufficiently closely spaced to permit the rotary contact arm 40 to bridge adjacent contacts. This provides an overlapping of the operation of adjacent cameras at the end of the period of operation of one camera and the beginning of the operating period of the succeeding camera.

It will be noted in Fig. 1 that the twelve cameras are placed about the race track 14 at such angles that they will include a maximum portion of the track within their respective fields. The angle of the camera to the track is varied according to its position relative to the straightaway or curved portions of the track.

With a system such as shown and described it is possible to conveniently make a motion picture record of events such as horse and automobile races. It is particularly advantageous in connection with horse races since it gives a complete and permanent record of the entire race which can be consulted by the race officials whenever desired.

The control unit is so arranged that the sequential operation of the cameras can be varied as to their periods of operation, depending upon the average speed of the horses in the race.

Figure 4:
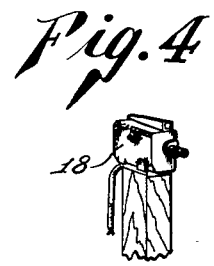
Fig. 4 is a perspective view of an electrically operated camera as it is mounted on an appropriately positioned supporting post.

It is preferred that the cameras be mounted on posts as shown in Fig. 4 so that they can be operated at heights convenient to the securing of clear and unobstructed views of the horses.

It will be understood, of course, that various changes can be made in the form, details, arrangements, and proportions of the various parts without departing from the spirit of the invention.

I claim as my invention:

In a control system for the sequential operation of cameras, a control station, a plurality of electrically operated cameras located at spaced points in predetermined sequential relationship about an area to be photographed, electrically controlled circuits from said control station to said cameras; and a plurality of individually and selectively operable circuit controlling switches in said circuits at said control station, said switches being located in closely spaced sequential relationship in the same positional relationship as said cameras, each of said switches having manually shiftable operating means, and the spacing of said switches being such that pairs of adjacent switches can be simultaneously reversely operated with one hand to break one camera circuit and make the next succeeding circuit.

EDWARD NASSOUR.

References Cited in the file of this patent

UNITED STATES PATENTS

| Number | Name | Date |
|---|---|---|
| 1,351,443 | Robertson | Aug. 31, 1920 |
| 2,269,862 | Rose | Jan. 13, 1942 |
| 2,320,434 | Holcomb | June 1, 1943 |
| 2,350,174 | Lucas et al. | May 30, 1944 |
| 2,408,528 | Nassour | Oct. 1, 1946 |
| 2,491,168 | Dusek | Dec. 13, 1949 |
| 2,523,662 | Miller | Sept. 26, 1950 |